United States Patent Office 2,719,103
Patented Sept. 27, 1955

2,719,103

D-TUBO-CURARINE CHLORIDE IN SUSPENSION OF WATER-INSOLUBLE SOAP IN INJECTABLE OIL

Alfred E. Jurist, Brooklyn, N. Y., and John C. Burke, Milltown, and William E. Gaunt, Dunellen, N. J., assignors to Olin Mathieson Chemical Corporation, a corporation of Virginia No Drawing. Original application December 19, 1947, Serial No. 792,856, now Patent No. 2,661,315, dated December 1, 1953. Divided and this application November 20, 1953, Serial No. 394,864

3 Claims. (Cl. 167—67)

This application is a division of application Serial No. 792,856, filed December 19, 1947, now Patent No. 2,661,315, issued December 1, 1953.

This invention relates to readily-absorbed drugs (i. e., drugs which, on injection into the tissues, are rapidly absorbed into the blood stream and rapidly eliminated therefrom, and whose drug effect is therefore transitory).

Although the following general description and most of the examples are concerned with the application of the invention to penicillin (as to which the invention is especially advantageous), it should be borne in mind that penicillin is merely exemplificative, and that the invention is of general applicability.

In the administration of penicillin, it is desirable from a therapeutic standpoint to maintain an effective concentration of penicillin in the blood stream for a prolonged period (say, 24 hours). On subcutaneous or intramuscular injection of an aqueous solution of penicillin, the penicillin is rapidly absorbed into the blood stream (reaching a maximum concentration therein in about a quarter hour) and rapidly excreted from the body (excretion being practically complete in about three hours); accordingly, injections must be repeated at about three-hour intervals or the solution administered by continuous infusion, which obviously may be inconvenient under many circumstances. Because of the high water-solubility of penicillin, no material improvement in this respect is obtained by administering the penicillin in oil suspension.

By a variety of expedients, most successfully by incorporating beeswax in an oil suspension of penicillin, it is possible to prolong the effective-blood-level period obtained from a single injection. The oil and beeswax constitute a depot-forming carrier from which the penicillin is gradually released into the aqueous tissue fluids, thus retarding (and extending the period of) absorption of the penicillin to such extent that a single daily injection is usually adequate to effect the required penicillin therapy.

Although such "oil and wax" depot preparations (which are in current and widespread use) are satisfactory from the standpoint of prolongation of the effective-blood-level period, they have a number of disadvantages. Thus, beeswax may contain pollen, which may produce allergic reactions; and because it is not metabolized by the body, the beeswax remains at the site of the injection long after the penicillin and oil are absorbed, resulting in local pain, irritation, and frequently abscesses.

Although penicillin and other readily-absorbed drugs have been incorporated into depot-forming carriers other than oil and beeswax prior to this invention, none of these depot preparations has been satisfactory from all of the standpoints indicated hereinbefore, as well as from such other standpoints as administrability by means of a glass-plunger syringe.

It is the object of this invention to provide improved depot-forming carriers for readily-absorbed drugs, improved depot preparations of readily-absorbed drugs, and methods of obtaining such depot-forming carriers and depot preparations.

It has been found that a suspension of a physiologically-acceptable, substantially water-insoluble soap in an oily medium suitable for intramuscular and subcutaneous administration (hereinafter referred to as an "administrable oily medium") constitutes an advantageous depot for the administration of readily-absorbed drugs to humans and other warm-blooded animals, in that the soap adequately retards (and extends the period of) absorption of the drug from the oily medium, produces little or no undesirable reactions, and gives promise of being non-antigenic and of being ultimately completely assimilated by the body. The depot-forming carriers of this invention may be produced, filled into containers, and distributed as such—the depot preparations of this invention being produced when needed, by incorporation of a readily-absorbed drug therein; alternatively (and preferably), the depot preparations of this invention are preformed, filled into containers, and distributed in a form ready for use.

By "substantially water-insoluble soap" is meant a substantially water-insoluble salt of an acid capable of forming an ordinary soap. The substantially water-insoluble soaps comprise the substantially water-insoluble salts of higher fatty acids (long-chain, saturated or unsaturated acids, which may be hydroxylated), resinic acids (e. g., abietic, pimelic, or primaric acid), and acids obtained by saponifying resins of natural origin (e. g., colophonium or shellac).

In place of the soap component, the depot-forming carriers and depot preparations of this invention may include components capable of forming the soap component in situ, i. e., after administration of the depot preparation. Thus, a retardation and extension of the period of drug-absorption of the same order (with minimum of reactions) may be obtained by substituting for the soap component, physiologically-acceptable components which, on contact with the aqueous tissue fluids, interact to form a physiologically-acceptable, substantially water-insoluble soap. These components are (I) a soap-forming acid, and (II) a physiologically-acceptable, substantially water-soluble salt the combination of whose cation with the anion of the soap-forming acid constitutes a physiologically-acceptable, substantially water-insoluble soap. In other words, an advantageous depot-forming carrier for readily-absorbed drugs may be composed of an administrable oily medium, a soap-forming acid and a physiologically-acceptable, substantially water-soluble salt capable of reacting therewith in the presence of water to provide a physiologically-acceptable substantially water-insoluble soap.

The substantially water-insoluble salts of higher fatty acids (or components capable of forming them in situ)—especially the calcium and aluminum salts of higher fatty acids—are preferred for the purposes of this invention. These comprise, inter alia: calcium palmitate, calcium stearate, aluminum stearate, magnesium stearate, calcium oleate, zinc stearate, calcium linoleate, calcium laurate, aluminum palmitate, and mixtures thereof; and other calcium, magnesium, zinc, iron, or aluminum salts of such higher fatty acids (or mixtures thereof) as palmitic, stearic, oleic, linoleic, lauric, myristic, ricinoleic, arachidic, linolic, and margaric acid, and cocoanut-oil fatty acids.

The components capable of forming the preferred soaps in situ comprise the higher fatty acids (or mixtures thereof) listed in the preceding paragraph, inter alia; and (as the salt for reaction therewith) substantially water-soluble salts of the metals listed in the preceding paragraph with such physiologically-acceptable-anion-containing acids as hydrochloric, sulfuric, acetic, phosphoric, gluconic, lactic, and tartaric, inter alia; e. g., calcium lactate, tricalcium phosphate, and calcium gluconate. A substantial stoichiometric excess of either the acid or the salt component should preferably be avoided.

The administrable oily media essentially comprise fatty, non-drying oils of animal or vegetable origin or their synthetic equivalents; inter alia, peanut oil, sesame oil, cottonseed oil, corn oil, soybean oil, synthetic glycerol esters of long-chain fatty acids, and mixtures of these and other oils. The consistency and/or other physical properties of these oils may be modified by inclusion of oil-miscible, physiologically-acceptable substances such as cetyl alcohol, hydrogenated oils (or fats), and ethyl oleate; and by regulation of the consistency of the oily medium and/or proportion of the soap, the rate of absorption of the drug may be controlled.

The depot-forming carriers of this invention may be employed for the administration of any readily-absorbed drug capable of administration by intramuscular or subcutaneous injection whose action it is desired to prolong. Among the readily-absorbed drugs thus administrable are those of the following types, inter alia: anesthetics, such as sodium 5-ethyl-5-(1-methylbutyl)-thiobarbiturate, procaine hydrochloride, and β-diethylaminoethyl p-ethoxybenzoate hydrochloride; anti-infectives, especially antibiotics, such as the penicillins (exemplified by the sodium, potassium, and calcium salts of penicillins G, F, K, X, and dihydro-F), the streptomycins, and therapeutically-effective derivatives thereof (exemplified by the following salts and therapeutically-effective derivatives: sulfate; phosphate; hydrochloride; calcium chloride double salt; interaction product with pectin; salt-type combination with a higher fatty acid, such as described in application Serial No. 762,205, filed July 19, 1947, now Patent No. 2,644,816, issued July 7, 1953; and salt-type combination with a surface-active agent of the organically-substituted polybasic inorganic acid type, such as described in application Serial No. 767,852, filed August 9, 1947, now Patent No. 2,537,934, issued January 9, 1951), and bacitracin; hormones and synthetic substitutes, such as testosterone and its esters, progesterone, crystalline and noncrystalline estrone, insulin, anterior-pituitary hormones, and desoxy-corticosterone acetate; vitamins and substitutes, such as vitamin A, vitamin D, menadione, thiamine hydrochloride, riboflavin, ascorbic acid, pyridoxine hydrochloride, folic acid, tocopherols, and niacinamide; sympathomimetic agents, such as epinephrin, amphetamine sulfate, and d-desoxyephedrine hydrochloride; sedatives and hypnotics, such as pentobarbital sodium; antihistaminics, such as β-dimethylaminoethyl benzhydryl ether hydrochloride and N'-pyridyl-N'-benzyl-N-dimethyl-ethylenediamine monohydrochloride; antispasmodics, such as curare and d-tubocurarine chloride; and anticoagulants, such as sodium heparin.

The depot-forming carriers and depot preparations of this invention may include components in addition to the soap (or soap-forming components) oily medium (including modifiers), and drug (in the case of depot preparations). Thus, the depot preparations may include additional drugs (for multiple drug effect); and both the depot-forming carriers and depot preparations may include drugs for local action in connection with the injection (e. g., anesthetic), a sterilizing agent (to maintain the sterility of multiple-dose preparations, for example), pectin (or other hydrophilic, readily-absorbable polysaccharide forming a gel on contact with aqueous tissue fluids, and thus further retarding and extending the period of absorption of the drug), and/or other substances.

The amount of the soap (or soap-forming components) used in the depot-forming carriers and depot preparations of this invention may be varied within wide limits. Thus, the amount should be enough to provide undissolved (suspended) soap, absorption-retardation being primarily attributable to that portion of the soap undissolved in the oily medium; and the amount should, of course, not be so great as to make the preparation too viscous for administration. Also, the amount of readily-absorbed drug in the depot preparations of this invention may be varied, within obvious limits. Thus, the amount must, of course, be enough to give the desired therapeutic effect for the desired period; and the upper limit is imposed, of course, by pharmacological considerations (effect and toxicity) as well as by the physical character of the preparation (e. g., viscosity).

The depot-forming carriers of this invention are produced by suspending the soap (or incorporating the soap-forming components) in the oily medium; and the depot preparations of this invention are produced by incorporating (i. e., dissolving and/or suspending) the drug and suspending the soap in the oily medium (the sequence of these operations being variable)—preferably by first suspending the soap in the oily medium and then incorporating the drug in the suspension. Preferably, also, any modification of the oil by inclusion of an oil-miscible, physiologically-acceptable substance should be effected first, especially if heating is required (as when incorporating a hydrogenated oil). Those components suspended in the oily medium (the soap and, in some cases, the readily-absorbable drug, inter alia) should desirably be in finely-divided form; but further retardation and extension of the period of absorption of the drug may be obtained, in some cases (e. g., that of penicillin), by having the drug particles of larger size, compatible, however, with passage of the preparation through a hypodermic needle.

The finely-divided form of the soap may be effected, for example, by suitable grinding (after chilling, where necessary) and screening, or by other mechanical means for reducing particle size; e. g., micronizing or micropulverizing. An especially-fine subdivision of the soap (and a highly advantageous form in that it materially increases the retardant effect of the soap and/or enables use of a materially smaller amount thereof) is effected by heating a mixture of the soap and the oily medium until the soap desolidifies (i. e., dissolves or flows in the oily medium), and agitating the mixing during cooling until the soap forms a highly dispersed solid phase in the oily medium. The finely-divided state of the drug (if a suspension thereof is to be formed) may be effected, for example, by freeze-drying an aqueous solution thereof (i. e., freezing the solution, and subjecting the solid to a high vacuum to sublime off the water).

Alternatively, where a suspension of the drug is to be formed, the soap may be so incorporated as to facilitate association of the soap particles with the drug particles. Thus, the associated drug and soap particles may be formed by incorporating both in the oily medium and grinding them therein to the desired particle size; or the soap may be precipitated (by chemical or physical means) in the oily medium containing the drug particles. Precipitation may be effected in the following ways, inter alia: by heating a mixture of the soap with a suspension of the drug in the oily medium until the soap desolidifies, and agitating the mixture during cooling until the soap forms a highly dispersed solid phase in the oily medium; and (where the presence of a small amount of water is not deleterious) by adding to the suspension of the drug in the oily medium the soap-forming components described hereinbefore, adding an amount of water sufficient to enable interaction between these soap-forming components, and thoroughly mixing to cause soap-formation and precipitation of the soap in the presence of the suspended drug.

The examples following are illustrative of the invention. [Certain conditions, techniques, results, etc. of general applicability are mentioned here to avoid repetition in each of the examples: Unless other means are specified, solution (e. g., of the modifier in the oil to provide the oily medium) is effected by warming, and/or stirring; and suspension (e. g., of the soap, or soap-forming components, in the oily medium), or thorough mixing, is effected in a high-speed mechanical mixer, or a homogenizer. Those preparations containing no components deleteriously affected thereby are heat-sterilized; otherwise, the necessary sterility is obtained by pre-sterilizing the components, and combining them, subdividing the preparation, and filling it into pre-sterilized containers, all under aseptic conditions. Any component not dissolved in the oily medium should be of such particle size as to permit of its ready passage through a hypodermic needle. Containers of the type heretofore employed for penicillin-oil-wax preparations (e. g., cartridges and vials) are employable for the preparations described in the examples. On administration of each of these preparations (subcutaneously, or preferably, by intramuscular injections), the particular drug is slowly absorbed, and its effect is maintained over an adequately prolonged period (thus, a single daily intramuscular injection of 1 ml. of the preparation described in Example 3, containing 300,000 units/ml., maintains a therapeutically-effective blood concentration of penicillin for about 24 hours or more, and hence is usually adequate to effect the required penicillin therapy); the incidence of undesirable reactions is so low that the preparations are capable of general use; and the preparations are sufficiently stable to withstand the effect of time, temperature variation, and other factors involved in modern large-scale distribution.]

Example 1

3.5 g. hydrogenated peanut oil is dissolved in 82.5 ml. peanut oil; 10 g. zinc stearate is suspended in the solution; and 24 g. crystalline sodium-penicillin G is thoroughly mixed with the suspension.

Example 2

12. g. stearic acid is dissolved in 82.5 ml. peanut oil; and 12 g. calcium lactate (screened through a 200-mesh screen) and 24 g. crystalline sodium-penicillin G are added to the solution, and thoroughly mixed therewith.

Example 3

2.5 g. hydrogenated peanut oil is dissolved in 82.5 ml. peanut oil; 15 g. calcium stearate (about 40-mesh) is mixed with the oily medium; the mixture is heated until the calcium stearate flows in the oily medium; the mixture is then stirred during cooling (the calcium stearate forming a highly-dispersed solid phase in the oily medium); and, while continuing the stirring (and after the temperature of the mixture has fallen to 140° C. or lower), 24 g. crystalline sodium-penicillin G is added and thoroughly mixed therewith.

Example 4

26 g. calcium stearate is added to 325 ml. peanut oil, and the mixture is (heat) treated as described in Example 3; and after the calcium stearate has formed a highly-dispersed solid phase in the oil and the temperature has fallen to 140° C. or lower, 80 g. crystalline sodium-penicillin G is added and thoroughly mixed therewith.

The calcium stearate in this preparation may be replaced by an equal weight of calcium oleate, calcium palmitate, magnesium stearate or zinc stearate. The magnesium stearate and zinc stearate (unlike the calcium stearate, calcium oleate and calcium palmitate) dissolve in the oily medium on heating (at about 120° C. and 130° C., respectively), but when stirred during cooling also form a highly dispersed solid phase in the oily medium.

Example 5

2.5 g. hydrogenated peanut oil is dissolved in 90 ml. peanut oil; 7.5 g. calcium stearate is added to the oily medium, and the mixture is (heat) treated as described in Example 3; and after the calcium stearate has formed a highly-dispersed solid phase in the oily medium and the temperature has fallen to 140° C. or lower, 24 g. crystalline sodium-penicillin G is added and thoroughly mixed therewith.

Example 6

4.0 g. hydrogenated peanut oil is dissolved in 82.5 ml. peanut oil; and 15 g. calcium oleate and 24 g. crystalline sodium-penicillin G are added to the warm solution and thoroughly mixed therewith.

The calcium oleate in this preparation may be replaced by an equal weight of magnesium stearate, calcium linoleate, calcium laurate, calcium palmitate, or aluminum stearate.

Example 7

1.0 g. hydrogenated peanut oil is dissolved in 30.6 ml. peanut oil; 4.35 g. calcium stearate is incorporated in the solution by warming (the apparent solution resulting containing, on cooling, at least part of the calcium stearate in finely-divided suspended form); and 15 g. commercial streptomycin hydrochloride (having a potency of 533 units/mg.) is thoroughly mixed therewith.

Example 8

3.4 g. hydrogenated peanut oil is dissolved in 53 ml. peanut oil; 9.3 g. calcium stearate is incorporated in the solution by warming; and 3.1 g. of a dry mixture obtained by freeze-drying a dilute aqueous solution of equal parts d-tubocurarine chloride and calcium lactate (cf. Burke and Jurist application Serial No. 700,370, filed October 1, 1946, now Patent No. 2,476,082, dated July 12, 1949), is thoroughly mixed therewith.

Example 9

5 g. hydrogenated peanut oil is dissolved in 100 ml. peanut oil; 15 g. aluminum palmitate is incorporated in the oily medium in the manner described in Example 3; and 6 g. β-diethylamino-ethyl p-ethoxy-benzoate is dissolved therein.

Example 10

2.0 g. hydrogenated peanut oil is dissolved in 70 ml. peanut oil; 15 g. aluminum stearate is incorporated in the oily medium in the manner described in Example 3; and 25 g. sodium heparin is thoroughly mixed therewith.

Example 11

5.0 g. hydrogenated peanut oil is dissolved in 80 ml. peanut oil; 15 g. calcium stearate is incorporated in the solution by warming; and 0.800 g. crystalline insulin is thoroughly mixed therewith.

The invention may be variously otherwise embodied within the scope of the appended claims.

We claim:

1. A substantially anhydrous non-gelled injectable therapeutic preparation comprising d-tubocurarine chloride dispersed in a suspension of a physiologically-acceptable, substantially water-insoluble soap in an injectable, fatty, non-drying oil, the quantity of such soap being sufficient to provide a solid phase thereof in the oil and thereby maintain prolonged effective blood levels of d-tubocurarine chloride upon injection of said preparation compared with the blood levels obtained upon injection of a similar preparation not containing such soap.

2. The preparation of claim 1 wherein the substantially water-insoluble soap is a calcium salt of a physiologically-acceptable soap-forming acid.

3. The preparation of claim 1, wherein the substantially water-insoluble soap is calcium stearate.

References Cited in the file of this patent

UNITED STATES PATENTS

| | | |
|---|---|---|
| 2,327,564 | Scherer | Aug. 24, 1943 |
| 2,507,193 | Buckwalter | May 9, 1950 |
| 2,661,315 | Jurist | Dec. 1, 1953 |

OTHER REFERENCES

Ohio State Med. J., Aug. 1942, p. 756.